(No Model.)
J. B. WALLACE.
METAL JOINT FOR HANGERS, &c.
No. 389,028. Patented Sept. 4, 1888.
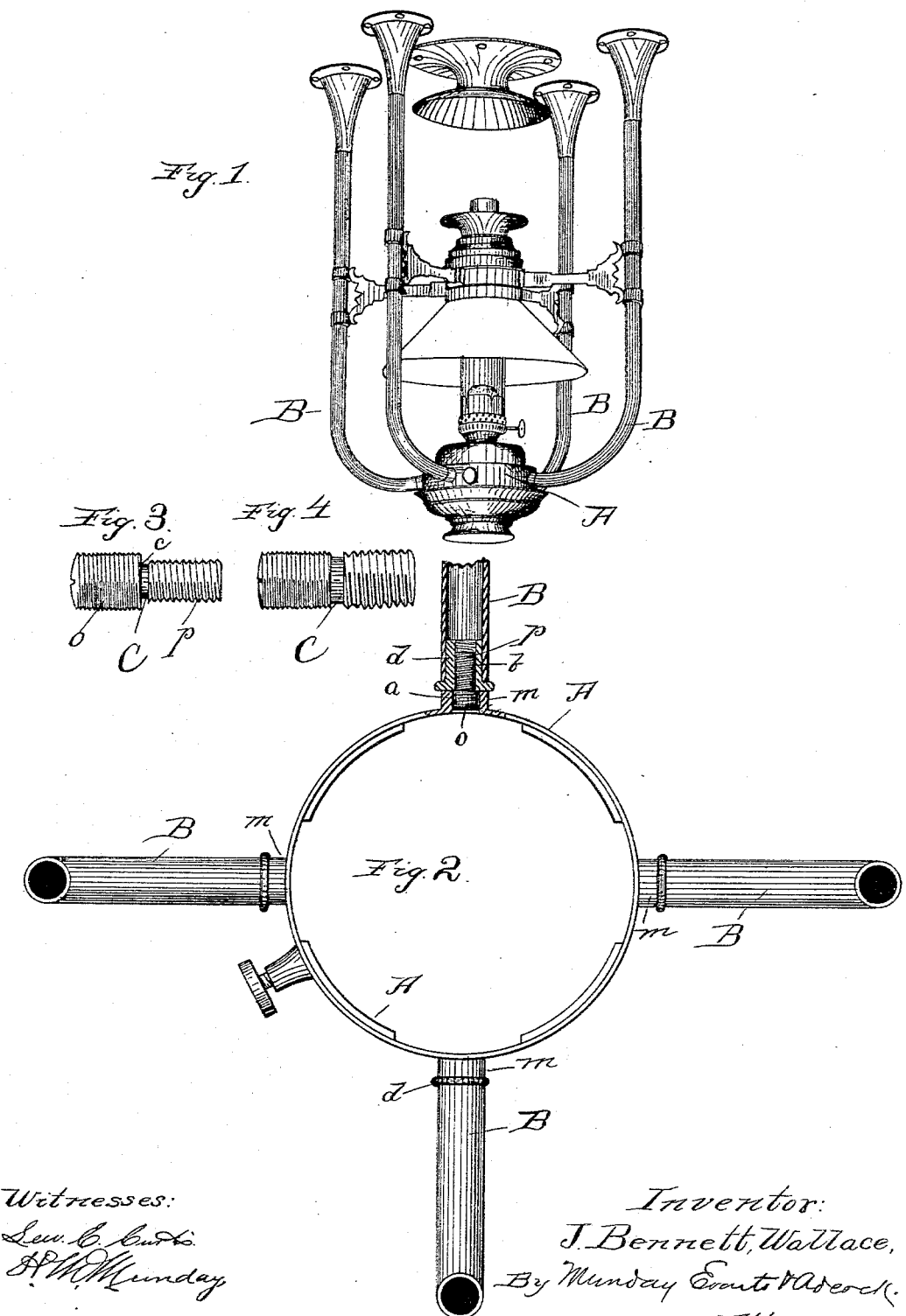
Witnesses:
Lew. C. Curtis
H. W. Munday
Inventor:
J. Bennett Wallace,
By Munday Evarts & Adcock.
his Attorneys.

UNITED STATES PATENT OFFICE.

J. BENNETT WALLACE, OF CHICAGO, ILLINOIS, ASSIGNOR TO GEORGE M. CLARK & COMPANY, OF SAME PLACE.

METAL JOINT FOR HANGERS, &c.

SPECIFICATION forming part of Letters Patent No. 389,028, dated September 4, 1888.

Application filed April 30, 1887. Serial No. 236,728. (No model.)

*To all whom it may concern:*

Be it known that I, J. BENNETT WALLACE, a citizen of the United States, residing at Chicago, in the county of Cook and State of Illinois, have invented a new and useful Improvement in Metal Joints for Hangers, &c., of which the following is a specification.

The customary manner of joining the supporting-arms to the oil-fount-holding rings of lamp brackets and hangers has been by means of a threaded stud on the end of the arm entering a correspondingly-sized threaded opening in the ring. So, also, in other parts of hangers and brackets—as, for instance, where end to end joints are formed between the two parts of which the arms are composed—it has been usual to provide the abutting end of one part with an internally-threaded opening and the abutting end of the other part with a threaded stud adapted to enter such opening. The joints of this kind between straight round pieces or between one such piece and another of different shape are easily put together in the proper relation, because the straight round part can be rotated until it is screwed home; but in the manufacture of ornamental work, like lamp brackets and hangers, the parts are not straight and round, and consequently must be in the proper relative position when the screw reaches home—that is to say, when they are joined the limit of rotation allowed by the screw must coincide with the permanent relative position desired for the parts, so that when such limit is reached the parts will necessarily be in proper alignment with each other. This result is difficult of attainment and necessitates in the great majority of cases a filing off of one part or the other to allow further rotation, the same being a special fitting operation in the case of each joint, and if, after being thus fitted together, the parts must be separated for subjecting them to other operations, such as plating or polishing, they must be marked, so that they can be identified after being finished and again brought together in the same relation. It will be seen that this fitting together, marking, and subsequent identification and assembling necessitate a very considerable amount of care and labor, which it is the object of this invention to do away with, and I accomplish such object by the following construction: Instead of forming a boss upon one of the parts, I provide both of the parts to be joined with internally-threaded openings, the thread in one being finer than that in the other, and in combination with such differently-threaded openings I employ a separate male screw, compound in character, having one end provided with a thread corresponding to that in one of the parts to be joined and the other end provided with a thread corresponding with that in the other part to be joined. I prefer to make one opening and the end of the screw which enters it larger than the other opening and its corresponding portion of the screw, and this construction I have more particularly illustrated.

The nature of the invention will be better understood from the drawings accompanying this specification and forming part thereof, and to which I beg now to refer, Figure 1 therein showing a hanging lamp such as is commonly used in railroad passenger-cars, the joints being united by my invention. Fig. 2 is an enlarged plan of the oil-fount-holding ring, the joint between it and one of the supporting-arms being shown in section. Fig. 3 is a view of one of the compound screws detached. Fig. 4 is a view similar to Fig. 3, showing the screw with both ends of the same diameter.

In said drawings, A may represent the oil-fount holder of an ordinary lamp, the same being one of the parts joined by the use of my invention, and B may represent the supporting-arms of such lamp, the same being the other parts joined by my invention.

C is the compound screw, one end, o, whereof is of larger diameter than the other portion, p, thereof, (though this is a matter of preference merely,) and is threaded with finer (or coarser) thread than is the latter. Both threads run in the same direction. The head of the screw is nicked, as shown, and for use in this particular place the head is not enlarged, as it is desirable that it enter wholly within the opening in the ring to avoid contact with the oil-fount. At each junction with said arms B the ring A is provided with an internally-threaded opening, $a$, located in the bosses $m$ and corresponding in diameter and pitch with the end *o* of the screw, and each of the arms B is provided with a like opening, *b*, either in the arm itself or in a sleeve, *d*, inserted therein, such opening *b* corresponding in size and pitch with the end *p* of the screw. In the use I have made of the invention I make the large part of the screw seven-sixteenths of an inch in diameter with a thread of twenty to the inch, and the smaller parts three-eighths of an inch in diameter with a thread of fourteen to the inch; but of course I do not wish to be limited to these relative proportions either in diameter or pitch of screw. In joining the parts by this compound screw I begin the engagement between the screw and the parts to be joined at such points in the rotation of the former as will result in bringing the abutting faces in close contact when the arm is standing in its proper position relative to the ring. I deem it desirable, however, where a very firm union is desired, that this close or "home" contact should take place with the upright part of the arm standing at a slight angle back of its permanent position—say fifteen or twenty degrees—and then, the screw being already tight, to further tighten the joint by moving the arm up to the permanent position which its shape gives it ample leverage to accomplish. The point or points in the rotation of the screw at which engagement with the two parts should take place is of course determined by the relative number of threads and their relative pitch; but it is a mere matter of adjustment to ascertain them, and a great advantage in the adjustment lies in the fact that there are numerous points at which the tightness of the screw and the position of the parts will coincide instead of a single one, as in the old construction. It will thus be perceived that the parts do not need to be fitted or assembled until they are entirely finished and ready for permanent attachment, and that no filing or change in any part is necessary, the fitting together being a mere matter of properly positioning the parts and the screw. Of course contact between the shoulder *c* upon the screw and the end of the arm should be avoided. When the joint is formed, the screw may be secured against loosening rotation in any of the ways employed with other screws; but I find that where the parts joined are of softer metal than the screw and the joint is properly tightened it is very secure without extraneous fastening. I account for this partly by the variation in threads and partly by the fact that the roughnesses of the screw embed themselves in the softer surrounding metal of the parts joined.

While I have illustrated but a single use of the invention, it will be understood that I do not limit myself to such, as it obviously can be used in many other metal joints where abutting parts are to be firmly united together. I am, however, aware that in pipe-couplings there have heretofore been employed bushings or nipples provided at their opposite ends with screw-threads of the same direction, but of different pitch—such, for instance, as are shown in Patent No. 56,324, to J. B. Mitchell, and Patent No. 87,554, to J. Edson; and I do not desire my claim to be understood as extending to anything contained in such pipe-couplings or in said patents, the compound and differently-threaded screw which I employ being used in a different manner and for a different purpose from the similarly-threaded bushings referred to.

I claim—

In a joint between abutting parts A and B, which require to be secured together in a certain relative alignment, the combination, with said parts provided with female screw-threads of the same direction but of different pitch, of the compound screw C, having the portions *o* and *p* provided with male screw-threads adapted to fit the threads of said parts A and B, said screw being also shaped at its end for being engaged and turned while within said parts by a suitable tool, substantially as set forth.

J. BENNETT WALLACE.

Witnesses:
H. M. MUNDAY,
EDW. S. EVARTS.